(12) United States Patent
Seder et al.

(10) Patent No.: US 10,274,647 B2
(45) Date of Patent: Apr. 30, 2019

(54) SELF-CLEANING FILM SYSTEM AND ARTICLE

(71) Applicant: GM GLOBAL TECHNOLOGY OPERATIONS LLC, Detroit, MI (US)

(72) Inventors: Thomas A. Seder, Fraser, MI (US); James A. Carpenter, Rochester Hills, MI (US); Gayatri V. Dadheech, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 10 days.

(21) Appl. No.: 15/598,841

(22) Filed: May 18, 2017

(65) Prior Publication Data

US 2018/0335548 A1 Nov. 22, 2018

(51) Int. Cl.
*G02B 1/00* (2006.01)
*G02B 1/18* (2015.01)
(Continued)

(52) U.S. Cl.
CPC .............. *G02B 1/18* (2015.01); *B01J 21/063* (2013.01); *B01J 23/50* (2013.01); *B01J 35/004* (2013.01);
(Continued)

(58) Field of Classification Search
CPC ... B01J 21/08; B01J 23/50; B01J 35/06; B01J 21/063; B01J 35/004; B01J 37/0244;
(Continued)

(56) References Cited

U.S. PATENT DOCUMENTS 4,047,804 A * 9/1977 Stephens .............. G03C 1/7614
359/586
9,861,974 B2 1/2018 Dadheech et al.
(Continued)

FOREIGN PATENT DOCUMENTS

DE 102018111827 A1 11/2018
DE 102018111828 A1 11/2018
(Continued)

*Primary Examiner* — Euncha P Cherry
(74) *Attorney, Agent, or Firm* — Harness, Dickey & Pierce, P.L.C.

(57) ABSTRACT

A self-cleaning film system includes a substrate and an anti-reflection film disposed on the substrate. The anti-reflection film includes a first sheet formed from titanium dioxide, a second sheet formed from silicon dioxide and disposed on the first sheet, and a third sheet formed from titanium dioxide and disposed on the second sheet. The system includes a self-cleaning film disposed on the anti-reflection film and including a monolayer disposed on the third sheet and formed from a fluorinated material selected from the group consisting of fluorinated organic compounds, fluorinated inorganic compounds, and combinations thereof. The self-cleaning film includes a plurality of regions disposed within the monolayer such that each of the plurality of regions abuts and is surrounded by the fluorinated material and includes a photocatalytic material. The system includes an adhesive layer adhered to the substrate and a release liner affixed to and removable from the adhesive layer.

20 Claims, 1 Drawing Sheet

(51) Int. Cl.
*B01J 21/06* (2006.01)
*B01J 23/50* (2006.01)
*B01J 35/00* (2006.01)
*B08B 7/00* (2006.01)
*B08B 17/02* (2006.01)
*G02B 1/115* (2015.01)
*G02B 27/00* (2006.01)

(52) U.S. Cl.
CPC ............... *B08B 7/00* (2013.01); *B08B 17/02* (2013.01); *G02B 1/115* (2013.01); *G02B 27/0006* (2013.01)

(58) Field of Classification Search
CPC .......... B01J 35/02; C09D 183/08; B05D 1/02; B05D 1/28; G03F 7/0752; G03F 7/40; G02B 27/0006; G02B 1/18; G02B 1/115; B08B 7/00; B08B 17/02
USPC ........................................................ 359/507
See application file for complete search history.

(56) References Cited

U.S. PATENT DOCUMENTS

| | | | |
|---|---|---|---|
| 10,052,622 | B2 | 8/2018 | Dadheech et al. |
| 2013/0087374 | A1* | 4/2013 | Nah ............... G06F 3/044 174/258 |
| 2018/0154345 | A1 | 6/2018 | Dadheech et al. |
| 2018/0318820 | A1 | 11/2018 | Dadheech et al. |
| 2018/0320023 | A1 | 11/2018 | Dadheech et al. |
| 2018/0333709 | A1 | 11/2018 | Seder et al. |
| 2018/0333710 | A1 | 11/2018 | Dadheech et al. |
| 2018/0333711 | A1 | 11/2018 | Dadheech et al. |
| 2018/0333756 | A1 | 11/2018 | Seder et al. |
| 2018/0334742 | A1 | 11/2018 | Dadheech et al. |
| 2018/0348509 | A1 | 12/2018 | Carpenter et al. |

FOREIGN PATENT DOCUMENTS

| | | |
|---|---|---|
| DE | 102018111830 A1 | 11/2018 |
| DE | 102018111831 A1 | 11/2018 |

\* cited by examiner

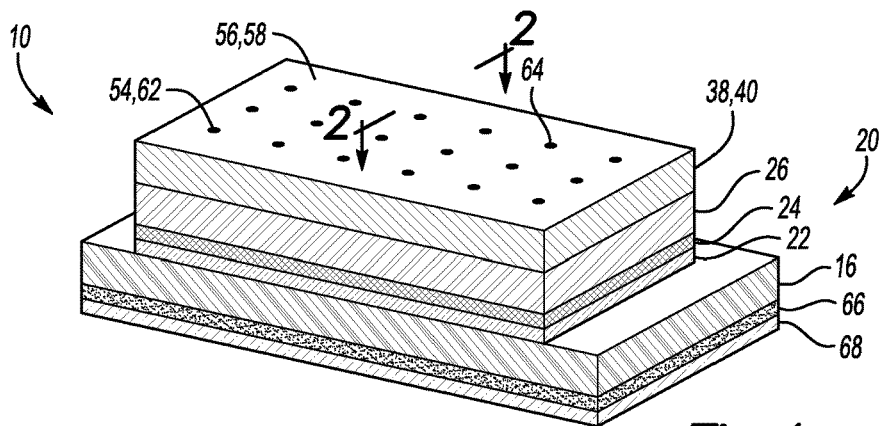
*Fig-1*
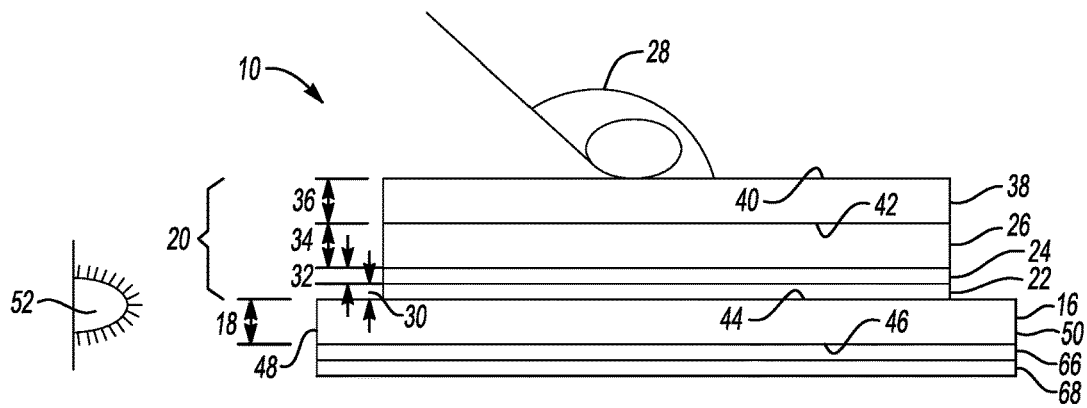
*Fig-2*
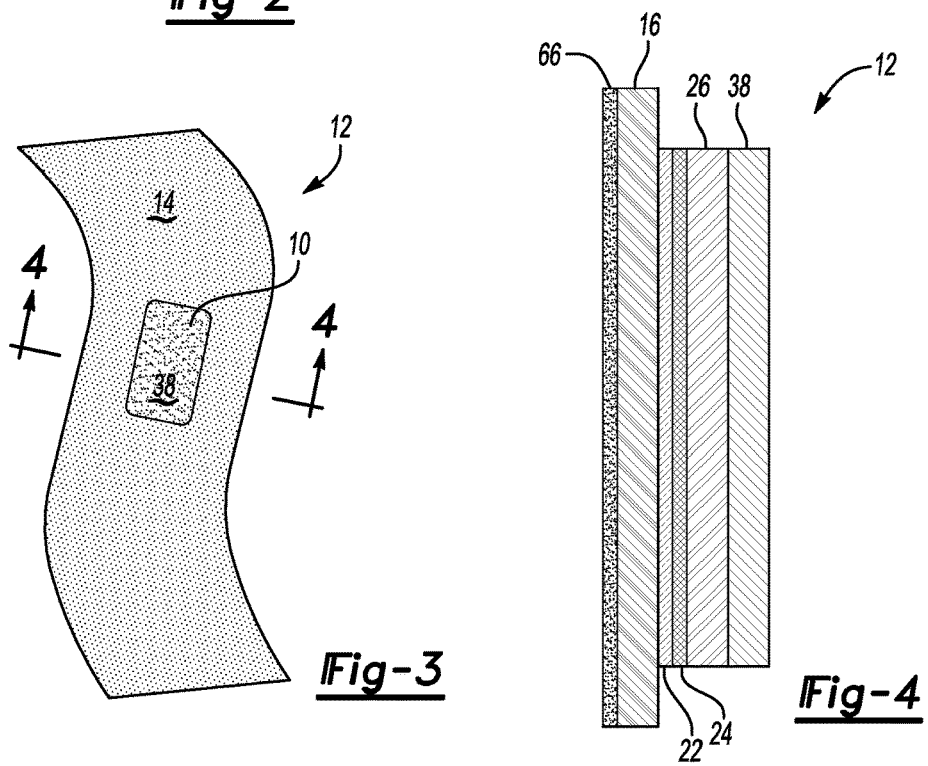
*Fig-3*
*Fig-4*

SELF-CLEANING FILM SYSTEM AND ARTICLE

INTRODUCTION

The disclosure relates to a self-cleaning film system and to a self-cleaning article.

Devices, such as display systems, are often designed to be touched by an operator. For example, a vehicle may include a display system that presents information to an operator via a touchscreen. Similarly, an automated teller machine or kiosk may include a display system that is activated by touch.

Other devices, such as cameras and eyeglasses, generally include a lens surface which may be inadvertently touched by an operator during use. Further, other devices such as vehicles, windows, mirrors, appliances, cabinetry, furniture, cellular telephones, fingerprint scanners, sensors, copiers, medical instruments, and countertops may also include one or more surfaces which may be touched by an operator. Therefore, during use, an operator may deposit fingerprints and/or oils onto such devices and surfaces.

SUMMARY

A self-cleaning film system includes a substrate and an anti-reflection film disposed on the substrate. The anti-reflection film includes a first sheet formed from titanium dioxide, a second sheet formed from silicon dioxide and disposed on the first sheet, and a third sheet formed from titanium dioxide and disposed on the second sheet. The self-cleaning film system also includes a self-cleaning film disposed on the anti-reflection film and including a monolayer disposed on the third sheet and formed from a fluorinated material selected from the group consisting of fluorinated organic compounds, fluorinated inorganic compounds, and combinations thereof. The self-cleaning film also includes a first plurality of regions disposed within the monolayer such that each of the first plurality of regions abuts and is surrounded by the fluorinated material, wherein each of the first plurality of regions includes a photocatalytic material. The self-cleaning film system also includes an adhesive layer adhered to the substrate and a release liner affixed to and removable from the adhesive layer.

In one aspect, the self-cleaning film may have a first surface and a second surface spaced opposite the first surface and abutting the anti-reflection film. The first surface may be substantially free from squalene.

The substrate may have a proximal surface abutting the second surface, a distal surface spaced opposite the proximal surface, a first edge connecting the proximal surface and the distal surface, and a second edge spaced opposite the first edge. The adhesive layer may abut the distal surface.

In another aspect, the self-cleaning film system may further include a light source disposed adjacent the first edge and configured for emitting electromagnetic radiation. The electromagnetic radiation may have a wavelength of from 400 nm to 100 nm. Alternatively, the electromagnetic radiation may have a wavelength of from 740 nm to 380 nm.

The self-cleaning film may define a contact angle with water of greater than 140°. The photocatalytic material may be titanium dioxide and may be present in a rutile form. In another aspect, the photocatalytic material may be titanium dioxide and may be present in an anatase form. Alternatively, the photocatalytic material may be titanium dioxide and may be present as a combination of the rutile form and the anatase form.

In an additional aspect, the photocatalytic material may be doped with silver. Alternatively, the self-cleaning film system may further include a second plurality of regions disposed within the monolayer such that each of the second plurality of regions abuts and is surrounded by the fluorinated material. Each of the second plurality of regions may include silver.

In one aspect, the fluorinated material is fluorinated diamond-like carbon. Further, the substrate may be formed from cellulose triacetate.

In another embodiment, a self-cleaning film system includes a substrate and an anti-reflection film disposed on the substrate. The anti-reflection film includes a first sheet formed from titanium dioxide, a second sheet formed from silicon dioxide and disposed on the first sheet, and a third sheet formed from titanium dioxide and disposed on the second sheet. The first sheet has a first thickness, the second sheet has a second thickness that is greater than the first thickness, and the third sheet has a third thickness that is greater than the first thickness and the second thickness. The self-cleaning film system also includes a self-cleaning film disposed on the anti-reflection film and including a monolayer disposed on the third sheet and formed from a fluorinated material selected from the group consisting of fluorinated organic compounds, fluorinated inorganic compounds, and combinations thereof. The self-cleaning film also includes a first plurality of regions disposed within the monolayer such that each of the first plurality of regions abuts and is surrounded by the fluorinated material, wherein each of the first plurality of regions includes a photocatalytic material. The self-cleaning film has a fourth thickness that is less than the third thickness and greater than the second thickness. The self-cleaning film system also includes an adhesive layer adhered to the substrate and a release liner affixed to and removable from the adhesive layer.

In one aspect, the self-cleaning film may have a first surface and a second surface spaced opposite the first surface and abutting the anti-reflection film. The first substrate may be substantially free from squalene.

A self-cleaning article includes a touchable surface and a self-cleaning film system adhered to the touchable surface. The self-cleaning film system includes a substrate and an anti-reflection film disposed on the substrate. The anti-reflection film includes a first sheet formed from titanium dioxide, a second sheet formed from silicon dioxide and disposed on the first sheet, and a third sheet formed from titanium dioxide and disposed on the second sheet. The self-cleaning film system also includes a self-cleaning film disposed on the anti-reflection film and including a monolayer disposed on the third sheet and formed from a fluorinated material selected from the group fluorinated organic compounds, fluorinated inorganic compounds, and combinations thereof. The self-cleaning film also includes a first plurality of regions disposed within the monolayer such that each of the first plurality of regions abuts and is surrounded by the fluorinated material, wherein each of the first plurality of regions includes a photocatalytic material. The self-cleaning film system also includes an adhesive layer adhered to the substrate and the touchable surface.

In one aspect, the self-cleaning film may have a first surface and a second surface spaced opposite the first surface and abutting the anti-reflection film. The first substrate may be substantially free from squalene. The photocatalytic material may be titanium dioxide and may be present in the first plurality of regions in an anatase form. The fluorinated material may be diamond-like carbon.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic illustration of a perspective view of a self-cleaning film system.

FIG. 2 is a schematic illustration of a cross-sectional view of the self-cleaning film system of FIG. 1 taken along section line 2-2.

FIG. 3 is a schematic illustration of a perspective view of a self-cleaning article including the self-cleaning film system of FIGS. 1 and 2.

FIG. 4 is a schematic illustration of a cross-sectional view of the self-cleaning article of FIG. 3 taken along section line 4-4.

DETAILED DESCRIPTION

Referring to the Figures, wherein like reference numerals refer to like elements, a self-cleaning film system 10 is shown generally in FIG. 1 and a self-cleaning article 12 including the self-cleaning film system 10 is shown generally in FIG. 3. The self-cleaning film system 10 and article 12 may be suitable for applications in which an operator may touch and deposit fingerprints, oils, and/or other organic or carbon-based contaminants or pathogens onto a screen, lens, or surface 14. More specifically, the self-cleaning film system 10 and article 12 may be useful for applications requiring a clean, substantially oil- or fingerprint-free screen, lens, or surface 14. That is, the self-cleaning film system 10 and article 12 may be useful for removing fingerprints and other organic contaminants from such screens, lenses, or surfaces 14.

For example, the self-cleaning film system 10 and the self-cleaning article 12 may be useful for automotive applications such as in-dash navigation systems which include a touchscreen, vehicle cameras which include a lens, vehicle mirrors, and vehicle interior surfaces. Alternatively, the self-cleaning film system 10 and article 12 may be useful for non-automotive applications such as, but not limited to, consumer electronics, cellular telephones, eyewear, personal protective equipment, appliances, furniture, kiosks, fingerprint scanners, medical devices, sensors, aircraft, and industrial vehicles.

Referring now to FIG. 3, the self-cleaning article 12 includes a touchable surface 14 and the self-cleaning film system 10 adhered to the touchable surface 14, as set forth in more detail below. The touchable surface 14 may be formed from a material, such as, but not limited to, plastic, composite, metal, wood, and the like. Further, the touchable surface 14 may have a selected rigidity, curvature, shape, and transparency. That is, the self-cleaning film system 10 may adhere to many types of touchable surfaces 14.

The touchable surface 14 may be configured to be touched by an operator during use. As such, the touchable surface 14 may be a component of, for example, but not limited to, windows, cabinetry, appliances, displays, writing utensils, eyeglasses, visors, telephones, toilets, drinking fountains, mirrors, steering wheels, door handles, shift knobs, hoods, decklids, surgical utensils, hygienic surfaces, and the like.

Referring now to FIG. 1, the self-cleaning film system 10 includes a substrate 16. The substrate 16 may be formed from a vitreous, transparent material suitable for refracting visible light. For example, in one embodiment, the substrate 16 may be formed from silicon dioxide. In another example, the substrate 16 may be formed from a polycarbonate or other plastic. In yet another embodiment, the substrate 16 may be formed from cellulose triacetate. The substrate 16 may have a suitable substrate thickness 18 (FIG. 2) according to a desired application of the self-cleaning film system 10 and article 12. For example, the substrate 16 may have a substrate thickness 18 of from 100 nm to 500 nm. In general, the substrate 16 may be configured as, by way of non-limiting examples, a screen of a display system, a lens of eyeglasses or goggles, a visor of a helmet, a surface 14 of a refrigerator, a face of a cabinet, a door panel of a vehicle, a touchscreen of a kiosk, or as another surface 14 or device that may be touched by an operator.

The self-cleaning film system 10 also includes an anti-reflection film 20 disposed on the substrate 16. The anti-reflection film 20 may be configured for reducing a reflection off the self-cleaning film system 10 and thereby improving an efficiency of the self-cleaning film system 10 by minimizing lost light in the system 10. As such, the self-cleaning film system 10 has both self-cleaning capabilities and comparatively low reflectance. The anti-reflection film 20 may be formed from an anti-reflection coating comprising alternating layers 22, 24, 26 of silicon dioxide and titanium dioxide. Each of the alternating sheets 22, 24, 26 of silicon dioxide and titanium dioxide may have a thickness 30, 32, 34 of from 5 nm to 125 nm. Further, the thickness 30, 32, 34 of each layer 22, 24, 26 may be optimized as set forth below to achieve broadband, spectral performance over wide incident angles.

For example, as described with reference to FIG. 2, the anti-reflection film 20 includes a first sheet 22 formed from titanium dioxide. In one embodiment, the first sheet 22 has a first thickness 30 of from 5 nm to 25 nm, e.g., 10 nm. The anti-reflection film 20 includes a second sheet 24 formed from silicon dioxide and disposed on the first sheet 22. In one embodiment, the second sheet 24 has a second thickness 32 that is greater than the first thickness 30. The second thickness 32 may be from 20 nm to 45 nm, e.g., 33 nm. The anti-reflection film 20 includes a third sheet 26 formed from titanium dioxide and disposed on the second sheet 24. In one embodiment, the third sheet 26 has a third thickness 34 that is greater than the first thickness 30 and the second thickness 32. The third thickness 34 may be from 50 nm to 200 nm, e.g., 100 nm. Although not shown, the anti-reflection film 20 may also include more than three layers or sheets 22, 24, 26. For example, the anti-reflection film 20 may have a fourth sheet disposed on the third sheet 26. The fourth sheet may be formed from silicon dioxide and may have a fourth thickness of from 50 nm to 150 nm, e.g., 75 nm.

Referring again to FIG. 1, the self-cleaning film system 10 also includes a self-cleaning film 38 disposed on the anti-reflection film 20, e.g., chemically bonded to the anti-reflection film 20 as set forth in more detail below. The self-cleaning film 38 may be configured to cover and protect the substrate 16 and anti-reflection film 20 from fingerprints, oils, and organic contaminants. That is, the self-cleaning film 38 may be configured to cause fingerprints, oils, and organic contaminants deposited on the self-cleaning film 38 to vanish, disappear, or vaporize so as to maintain a clean substrate 16 that is capable of displaying crisp images or reflections.

More specifically, as described with reference to FIG. 2, the self-cleaning film 38 may have a first surface 40 and a second surface 42 spaced opposite the first surface 40. The second surface 42 may abut the anti-reflection film 20, and the first surface 40 may be substantially free from squalene, organic material, and/or other oils of fatty acids. As used herein, the terminology squalene refers to an organic compound having 30 carbon atoms and represented by the International Union of Pure and Applied Chemistry name (6E,10E,14E,18E)-2,6,10,15,19,23-hexamethyltetracosa-2, 6,10,14,18,22-hexaene. In general, the self-cleaning film 38 may be characterized as a thin film and may have a fourth thickness 36 of, for example, from 5 nm to 30 nm. In one embodiment, the fourth thickness 36 is less than the third thickness 34 and greater than the second thickness 32. For example, the self-cleaning film 38 may have a fourth thickness 36 of 75 nm.

The substrate 16 may also have a proximal surface 44 abutting the anti-reflection film 20 and a distal surface 46 spaced opposite the proximal surface 44. Therefore, the substrate 16, the anti-reflection film 20, and the self-cleaning film 38 are configured to transmit visible light through the proximal surface 44, the distal surface 46, the first surface 40, and the second surface 42. The substrate 16 may also have a first edge 48 connecting the proximal surface 44 and the distal surface 46, and a second edge 50 spaced opposite the first edge 48.

The self-cleaning film 38 may define a contact angle 28 with water of greater than or equal to 115°, e.g., greater than 140°. For example, the self-cleaning film 38 may define a contact angle 28 with water of greater than or equal to 150°. As such, water, oils, and contaminants may effectively bead on and translate across the first surface 40. Stated differently, water, oils, and contaminants may be mobile and effectively translate along the first surface 40 and the first surface 40 may not be wettable.

Referring to FIG. 2, the self-cleaning film system 10 may further include a light source 52 disposed adjacent the first edge 48 and configured for emitting electromagnetic radiation. For example, the light source 52 may be an ultraviolet light-emitting diode and the electromagnetic radiation may have a wavelength of from 400 nm to 100 nm. Alternatively, the light source 52 may be an incandescent bulb or a visible light-emitting diode and the electromagnetic radiation may have a wavelength of from 740 nm to 380 nm.

The self-cleaning film 38 is formed from a self-cleaning coating composition. That is, the self-cleaning film 38 may mitigate fingerprint and oil deposition, i.e., self-clean. The self-cleaning coating composition and self-cleaning film 38 include a photocatalytic material 54 (FIG. 1) and a fluorinated material 56 (FIG. 1), as set forth in more detail below.

Referring now to FIG. 1, the self-cleaning film 38 includes a monolayer 58 disposed on the third sheet 26 and formed from a fluorinated material 56 selected from the group consisting of fluorinated organic compounds, fluorinated inorganic compounds, and combinations thereof. As best shown in FIG. 1, the monolayer 58 may form a majority of the self-cleaning film 38 and may be characterized as a monolayer field. As used herein, the terminology monolayer refers to a layer having a thickness 36 (FIG. 2) of one molecule. That is, the monolayer 58 is one molecule thick and may be characterized as a thin layer. In one embodiment, the fluorinated material 56 is fluorinated diamond-like carbon. In another embodiment, the fluorinated material 56 is fluorinated tin (IV) oxide. The fluorinated material 56, i.e., fluorinated organic compounds, fluorinated inorganic compounds, and combinations thereof such as fluorinated diamond-like carbon or fluorinated tin (IV) oxide, provides the self-cleaning film 38 with superhydrophobicity, anti-microbial properties, anti-soiling properties, and scratch-resistance. The self-cleaning film 38 may also contribute to a clean air quality of an ambient environment in which the self-cleaning film 38 is used.

As shown in FIG. 1, the self-cleaning film 38 also includes a first plurality of regions 62 disposed within the monolayer 58 such that each of the first plurality of regions 62 abuts and is surrounded by the fluorinated material 56. That is, the first plurality of regions 62 are situated within and along the monolayer 58. In one embodiment, the first plurality of regions 62 may be equally spaced apart from each other along the first surface 40. In other embodiments, the first plurality of regions 62 may be randomly spaced throughout the monolayer 58 along the first surface 40. In still other embodiments, the first plurality of regions 62 may be arranged in a pattern within the monolayer 58. The first plurality of regions 62 may be present in the self-cleaning film 38 in an amount of from about 10 parts by volume to about 85 parts by volume based on 100 parts by volume of the self-cleaning film 38, e.g., about 50 parts by volume based on 100 parts by volume of the self-cleaning film 38.

Each of the first plurality of regions 62 includes the photocatalytic material 54, such as titanium dioxide. The photocatalytic material 54 may provide the self-cleaning film 38 with self-cleaning capability. That is, the photocatalytic material 54 may oxidize and/or vaporize organic material, e.g., squalene, present on the first surface 40 of the self-cleaning film 38, as set forth in more detail below. In particular, the photocatalytic material 54 may be a light-activated photocatalyst upon exposure to, for example, visible or ultraviolet light.

Suitable photocatalytic materials 54 may include, but are not limited to, photo-oxidative semiconductors, semiconducting oxides, doped metal oxides, heterojunction materials, and combinations thereof.

In one embodiment, the photocatalytic material 54 may be titanium dioxide and may be present in the plurality of first regions 62 in a rutile form. Alternatively, the photocatalytic material 54 may be titanium dioxide and may be present in the plurality of first regions 62 in an anatase form, which may exhibit a comparatively higher photocatalytic activity than the rutile form. In other embodiments, the photocatalytic material 54 may be titanium dioxide and may be present in the plurality of first regions 62 as a combination of the rutile form and the anatase form. Further, the photocatalytic material 54 may be doped to form a functionalized photocatalytic material, e.g., functionalized titanium dioxide. For example, the functionalized photocatalytic material may be doped with a metal such as, but not limited to, chromium, cobalt, copper, vanadium, iron, silver, platinum, molybdenum, lanthanum, niobium, and combinations thereof. Alternatively, the functionalized photocatalytic material may be doped with a non-metal such as, but not limited to, nitrogen, sulfur, carbon, boron, potassium, iodine, fluorine, and combinations thereof.

The photocatalytic material 54 may be characterized as a nanoparticle and may have an average diameter measurable on a nanometer scale. Alternatively, the photocatalytic material 54 may be characterized as a particle and may have an average diameter measurable on a micrometer scale. Generally, the photocatalytic material 54 may be present in the self-cleaning film 38 in an amount of from about 2 parts by volume to about 35 parts by volume based on 100 parts by volume of the self-cleaning film 38.

In other non-limiting embodiments, the photocatalytic material 54 may include a semiconducting oxide such as, but not limited to, zinc oxide, bismuth, tin oxide, and combinations thereof. The semiconducting oxide may be selected to have a band gap separation suitable for a photocatalytic reaction, as set forth in more detail below.

In another embodiment, the self-cleaning film 38 may include a second plurality of regions 64 disposed within the monolayer 58 such that each of the second plurality of regions 64 abuts and is surrounded by the fluorinated material, wherein each of the second plurality of regions 64 includes silver.

That is, the second plurality of regions 64 may also be situated within and along the monolayer 58. In one embodiment, the second plurality of regions 64 may be equally spaced apart from each other along the first surface 40. In other embodiments, the second plurality of regions 64 may be randomly spaced throughout the monolayer 58 along the first surface 40. In still other embodiments, the second plurality of regions 64 may be arranged in a pattern within the monolayer 58. The second plurality of regions 64 may be present in the self-cleaning film 38 in an amount of from about 10 parts by volume to about 85 parts by volume based on 100 parts by volume of the self-cleaning film 38, e.g., about 25 parts by volume based on 100 parts by volume of the self-cleaning film 38.

The silver may be characterized as a nanoparticle and may have an average diameter measurable on a nanometer scale. Alternatively, the silver may be characterized as a particle and may have an average diameter measurable on a micrometer scale. Generally, the silver may be present in the self-cleaning film 38 in an amount of from about 2 parts by volume to about 35 parts by volume based on 100 parts by volume of the self-cleaning film 38. The silver may provide the self-cleaning film 38 with soil-resistance, anti-microbial, and air-purifying properties. For example, the silver may disrupt microbe cellular function. In particular, the silver may contribute to phospholipid decomposition such that a microbe cell well cannot undergo respiration.

Referring again to FIG. 1, the self-cleaning film system 10 also includes an adhesive layer 66 adhered to the substrate 16. More specifically, the adhesive layer 66 may abut the distal surface 46. As such, the self-cleaning article 12 includes the adhesive layer 66 adhered to the substrate 16 and to the touchable surface 14. Therefore, the self-cleaning film system 10 may be a sheet or composite that is separately adherable to the touchable surface 14. That is, the self-cleaning film system 10 may be manufactured separately from, and then subsequently attached to, the touchable surface 14 to thereby form the self-cleaning article 12 and protect the touchable surface 14 from organic contaminants such as squalene. Further, the self-cleaning film system 10 may be removable from and repositionable on the touchable surface 14.

The adhesive layer 66 may be formed from a suitable adhesive composition and may affix the self-cleaning film system 10 to the touchable surface 14. Therefore, the adhesive layer 66 may be selected according to the desired performance characteristics of the self-cleaning article 12. For example, the adhesive layer 66 may have a comparatively high adhesion for embodiments in which the self-cleaning film system 10 is not removable from the touchable surface 14. Alternatively, the adhesive layer 66 may have a comparatively low adhesion for embodiments in which the self-cleaning film system 10 is removable from the touchable surface 14. Likewise, the adhesive layer 66 may have a comparatively high temperature-resistance for applications for high-temperature environments. Similarly, the adhesive layer 66 may have a comparatively high water-resistance for applications for aqueous environments.

As set forth above, the self-cleaning film system 10 may be manufactured separately before adhering to the touchable surface 14 to form the self-cleaning article 12. As such, the self-cleaning film system 10 also includes a release liner 68 (FIG. 1) affixed to and removable from the adhesive layer 66. When it is desired that the self-cleaning film system 10 be adhered to the touchable surface 14, the release liner 68 may be peeled or removed from the adhesive layer 66 so that the adhesive layer 66 may face, abut, and adhere to the touchable surface 14.

That is, the self-cleaning film system 10 includes the release liner 68 so that the self-cleaning film system 10 may be provided as an adhesive sheet that is capable of adherence to, repositioning on, and removal from the touchable surface 14. The release liner 68 may be formed from a paper, such as Kraft paper or machine glazed paper, or a plastic, such as polyethylene terephthalate or polypropylene. The self-cleaning film system 10 may therefore be applied to touchable surfaces 14, such as, but not limited to, windows, cabinetry, appliances, displays, writing utensils, eyeglasses, visors, telephones, toilets, drinking fountains, mirrors, steering wheels, door handles, shift knobs, hoods, decklids, surgical utensils, hygienic surfaces, and the like.

During use of the self-cleaning film system 10 and the self-cleaning article 12, an operator may deposit fingerprints, squalene, organic matter, and/or oils onto the first surface 40 (FIG. 2). Oils may include oils of fatty acids and may be synthesized naturally and applied to first surface 40 as the operator touches the first surface 40, or may be applied to the first surface 40 artificially such as by spraying or coating.

Contact between the squalene, the photocatalytic material 54 which is exposed to electromagnetic radiation emitted by a light source having a wavelength of less than 357 nm, and water may initiate formation of radicals. The radicals may then react with hydrocarbon debris. More specifically, the photocatalytic material 54 may be a photocatalyst such as titanium dioxide. A photocatalytic reaction may create a strong oxidation agent and breakdown the organic matter, e.g., squalene, to low chain hydrocarbon to carbon dioxide and water in the presence of the photocatalyst, i.e., the photocatalytic material 54; electromagnetic radiation, e.g., ultraviolet light; and water, e.g., humidity from ambient conditions. As such, the photocatalytic material 54 may not be consumed by the catalytic reaction, but may instead solely accelerate the photocatalytic reaction as a non-reactant.

In greater detail, when electromagnetic radiation having a desired wavelength illuminates the photocatalytic material 54, an electron from the valence band of the photocatalytic material 54 may promote to the conduction band of the photocatalytic material 54, which in turn may create a hole in the valence band and an excess of negative charge or electron in the conduction band. The hole may assist oxidation and the electron may assist reduction. Generally, the hole may combine with water to produce a hydroxyl radical (.OH). The hole may also react directly with squalene or other organic material to increase an overall self-cleaning efficiency of the self-cleaning film system 10. Similarly, oxygen in the ambient environment surrounding the photocatalytic material 54 may be reduced by the electron to form a superoxide ion ($.O_2-$), which in turn may oxidize the organic material present on the self-cleaning film system 10.

In addition, the hole may become trapped before recombination with the electron. For such situations, the photocatalytic material 54 may be functionalized. For example, titanium dioxide may be doped with, for example, palladium or ruthenium. The palladium or ruthenium may act as an electrocatalyst and may increase a transfer of electrons to oxygen molecules, which may in turn lower the occurrence of the recombination of electrons and holes.

Further, organic material that is present on the fluorinated material 56 rather than in direct contact with the photocatalytic material 54 may be in dynamic equilibrium with the first surface 40 (FIG. 2) and may diffuse toward a comparatively higher-energy location on the self-cleaning film 38, i.e., the photocatalytic material 54. Therefore, the self-cleaning film 38 may diffuse the squalene along the self-cleaning film 38 from the fluorinated material 56 to the photocatalytic material 54. To improve such diffusion, the light source 52 may be tuned to emit electromagnetic radiation having a wavelength that is tuned to a vibration resonance of the squalene and the fluorinated material 56. Such tuning may enable the squalene or fingerprint to wiggle or translate along the fluorinated material 56 to the photocatalytic material 54 where the squalene may undergo the photocatalytic reaction described above. Alternatively or additionally, the self-cleaning film 38 may also be heated, for example by infrared radiation, to further improve diffusion across the fluorinated material 56 towards the photocatalytic material 54.

Once the squalene contacts the photocatalytic material 54, the squalene may be photolyzed into comparatively low vapor pressure-sized pieces or parts, which may vaporize off the self-cleaning film 38 and thereby remove the fingerprint or squalene from the self-cleaning film 38. Therefore, the self-cleaning film 38 may protect the substrate 16 by removing, e.g., oxidizing and vaporizing the fingerprints, squalene, oils, and/or organic material deposited by the touch of an operator. Consequently, the self-cleaning film system 10 and article 12 may provide excellent aesthetics, cleanliness, and readability for display systems, lenses, sensors, and surfaces 14.

While the best modes for carrying out the disclosure have been described in detail, those familiar with the art to which this disclosure relates will recognize various alternative designs and embodiments for practicing the disclosure within the scope of the appended claims.

What is claimed is:

1. A self-cleaning film system comprising:
a substrate;
an anti-reflection film disposed on the substrate and including:
a first sheet formed from titanium dioxide;
a second sheet formed from silicon dioxide and disposed on the first sheet; and
a third sheet formed from titanium dioxide and disposed on the second sheet;
a self-cleaning film disposed on the anti-reflection film and including:
a monolayer disposed on the third sheet and formed from a fluorinated material selected from the group consisting of fluorinated organic compounds, fluorinated inorganic compounds, and combinations thereof; and
a first plurality of regions disposed within the monolayer such that each of the first plurality of regions abuts and is surrounded by the fluorinated material, wherein each of the first plurality of regions includes a photocatalytic material;
an adhesive layer adhered to the substrate; and
a release liner affixed to and removable from the adhesive layer.

2. The self-cleaning film system of claim 1, wherein the self-cleaning film has a first surface and a second surface spaced opposite the first surface and abutting the anti-reflection film, and further wherein the first surface is substantially free from squalene.

3. The self-cleaning film system of claim 2, wherein the substrate has:
a proximal surface abutting the second surface;
a distal surface spaced opposite the proximal surface;
a first edge connecting the proximal surface and the distal surface; and
a second edge spaced opposite the first edge; and
further including a light source disposed adjacent the first edge and configured for emitting electromagnetic radiation.

4. The self-cleaning film system of claim 3, wherein the electromagnetic radiation has a wavelength of from 400 nm to 100 nm.

5. The self-cleaning film system of claim 3, wherein the electromagnetic radiation has a wavelength of from 740 nm to 380 nm.

6. The self-cleaning film system of claim 3, wherein the adhesive layer abuts the distal surface.

7. The self-cleaning film system of claim 1, wherein the self-cleaning film defines a contact angle with water of greater than 140°.

8. The self-cleaning film system of claim 1, wherein the photocatalytic material is titanium dioxide and present in the first plurality of regions in a rutile form.

9. The self-cleaning film system of claim 1, wherein the photocatalytic material is titanium dioxide and is present in the first plurality of regions in an anatase form.

10. The self-cleaning film system of claim 1, wherein the photocatalytic material is titanium dioxide and is present in the first plurality of regions as a combination of a rutile form and an anatase form.

11. The self-cleaning film system of claim 1, wherein the photocatalytic material is doped with silver.

12. The self-cleaning film system of claim 1, further including a second plurality of regions disposed within the monolayer such that each of the second plurality of regions abuts and is surrounded by the fluorinated material, wherein each of the second plurality of regions includes silver.

13. The self-cleaning film system of claim 1, wherein the fluorinated material is fluorinated diamond-like carbon.

14. The self-cleaning film system of claim 1, wherein the substrate is formed from cellulose triacetate.

15. A self-cleaning film system comprising:
a substrate;
an anti-reflection film disposed on the substrate and including:
a first sheet formed from titanium dioxide;
a second sheet formed from silicon dioxide and disposed on the first sheet; and
a third sheet formed from titanium dioxide and disposed on the second sheet;
wherein the first sheet has a first thickness, the second sheet has a second thickness that is greater than the first thickness, and the third sheet has a third thickness that is greater than the first thickness and the second thickness;
a self-cleaning film disposed on the anti-reflection film and including:
a monolayer disposed on the third sheet and formed from a fluorinated material selected from the group consisting of fluorinated organic compounds, fluorinated inorganic compounds, and combinations thereof; and a first plurality of regions disposed within the monolayer such that each of the first plurality of regions abuts and is surrounded by the fluorinated material, wherein each of the first plurality of regions includes a photocatalytic material;

wherein the self-cleaning film has a fourth thickness that is less than the third thickness and greater than the second thickness;

an adhesive layer adhered to the substrate; and a release liner affixed to and removable from the adhesive layer.

16. The self-cleaning film system of claim 15, wherein the self-cleaning film has a first surface and a second surface spaced opposite the first surface and abutting the anti-reflection film, and further wherein the first surface is substantially free from squalene.

17. A self-cleaning article comprising:

a touchable surface; and a self-cleaning film system adhered to the touchable surface and including:
   a substrate;
   an anti-reflection film disposed on the substrate and including:
      a first sheet formed from titanium dioxide;
      a second sheet formed from silicon dioxide and disposed on the first sheet; and
      a third sheet formed from titanium dioxide and disposed on the second sheet;
   a self-cleaning film disposed on the anti-reflection film and including:
      a monolayer disposed on the third sheet and formed from a fluorinated material selected from the group consisting of fluorinated organic compounds, fluorinated inorganic compounds, and combinations thereof; and
      a first plurality of regions disposed within the monolayer such that each of the first plurality of regions abuts and is surrounded by the fluorinated material, wherein each of the first plurality of regions includes a photocatalytic material; and
   an adhesive layer adhered to the substrate and the touchable surface.

18. The self-cleaning article of claim 17, wherein the self-cleaning film has a first surface and a second surface spaced opposite the first surface and abutting the anti-reflection film, and further wherein the first surface is substantially free from squalene.

19. The self-cleaning article of claim 17, wherein the photocatalytic material is titanium dioxide and is present in the first plurality of regions in an anatase form.

20. The self-cleaning article of claim 19, wherein the fluorinated material is fluorinated diamond-like carbon.

* * * * *